US009471945B2

(12) United States Patent
Jindal et al.

(10) Patent No.: US 9,471,945 B2
(45) Date of Patent: *Oct. 18, 2016

(54) SETTINGS MANAGEMENT OF AN ONLINE SERVICE

(71) Applicant: LinkedIn Corporation, Mountain View, CA (US)

(72) Inventors: Divya Jindal, Palo Alto, CA (US); Ian Alexander Lindsay, San Francisco, CA (US); Johan Rindegard, Cupertino, CA (US); Sara Harrington, Atherton, CA (US); Sarah E. Clatterbuck, Sunnyvale, CA (US); Sean Sands, Mountain View, CA (US); Shernaz R. Pavri, Sunnyvale, CA (US); Steven Foote, Santa Clara, CA (US); Timothy Lindvall, II, Santa Clara, CA (US); Erika Rottenberg, Portola Valley, CA (US)

(73) Assignee: LINKEDIN CORPORATION, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/479,211

(22) Filed: Sep. 5, 2014

(65) Prior Publication Data
US 2015/0040016 A1 Feb. 5, 2015

Related U.S. Application Data

(63) Continuation-in-part of application No. 13/956,228, filed on Jul. 31, 2013.

(60) Provisional application No. 61/860,146, filed on Jul. 30, 2013.

(51) Int. Cl.
*G06F 3/048* (2013.01)
*G06Q 50/00* (2012.01)
(Continued)

(52) U.S. Cl.
CPC ............. *G06Q 50/01* (2013.01); *H04L 51/32* (2013.01); *G06F 3/0482* (2013.01); *G06F 17/30* (2013.01)

(58) Field of Classification Search
CPC .................... G06F 3/048–3/04842; G06F 17/30–17/30905
See application file for complete search history.

(56) References Cited

U.S. PATENT DOCUMENTS 5,754,176 A 5/1998 Crawford
6,104,398 A * 8/2000 Cox et al. .................. 715/821
(Continued)

OTHER PUBLICATIONS

Rutledge, P.A., "Sams Teach Yourself LinkedIn in 10 minutes, Third Edition", 2012, Sams, pp. 30-32,36,38,65,67.*

(Continued)

*Primary Examiner* — Claudia Dragoescu
(74) *Attorney, Agent, or Firm* — Schwegman Lundberg & Woessner, P.A.

(57) ABSTRACT

Methods and systems of managing settings are described. According to various embodiments, a settings page corresponding to a user's settings on an online service may be caused to be displayed on a device. The settings page may comprise selectable category setting options for a setting category. The setting category may have a plurality of subcategories, and each subcategory may have its own selectable subcategory setting options. Each one of the category setting options may correspond to its own distinct configuration of subcategory setting options for its subcategories. A user input indicating a selection of one of the category setting options for the setting category may be received. The configuration of subcategory setting options corresponding to the selected one of the category setting options for the setting category may be applied to the user's settings on the online service.

19 Claims, 12 Drawing Sheets

(51) Int. Cl.
*H04L 12/58* (2006.01)
*G06F 3/0482* (2013.01)
*G06F 17/30* (2006.01)

(56) References Cited

U.S. PATENT DOCUMENTS

| | | | |
|---|---|---|---|
| 2005/0222900 A1* | 10/2005 | Fuloria et al. | 705/14 |
| 2006/0294158 A1* | 12/2006 | Tsyganskiy et al. | 707/202 |
| 2009/0077499 A1 | 3/2009 | Svendsen et al. | |
| 2010/0318919 A1* | 12/2010 | Murphy et al. | 715/745 |
| 2010/0325559 A1* | 12/2010 | Westerinen et al. | 715/753 |
| 2012/0260192 A1* | 10/2012 | Detweiler | 715/745 |
| 2012/0311462 A1* | 12/2012 | Devecka | 715/753 |
| 2015/0040015 A1 | 2/2015 | Jindal et al. | |

OTHER PUBLICATIONS

"U.S. Appl. No. 13/956,228, Examiner Interview Summary mailed Jun. 17, 2014", 3 pgs.

"U.S. Appl. No. 13/956,228, Final Office Action mailed Apr. 11, 2014", 24 pgs.

"U.S. Appl. No. 13/956,228, Non Final Office Action mailed Nov. 6, 2014", 28 pgs.

"U.S. Appl. No. 13/956,228, Non Final Office Action mailed Dec. 6, 2013", 21 pgs.

"U.S. Appl. No. 13/956,228, Response filed Mar. 6, 2014 to Non Final Office Action mailed Dec. 6, 2013", 15 pgs.

"U.S. Appl. No. 13/956,228. Response filed Jul. 11, 2014 to Final Office Action mailed Apr. 11, 2014.", 18 pgs.

"U.S. Appl. No. 13/956,228, Final Office Action mailed Jul. 22, 2015", 28 pgs.

"U.S. Appl. No. 13/956,228, Response filed May 6, 2015 to Non Final Office Action mailed Nov. 6, 2014", 13 pgs.

U.S. Appl. No. 13/956,228, Notice of Allowance mailed Feb. 25, 2016, 9 pgs.

U.S. Appl. No. 13/956,228, Response filed Jan. 22, 2016 to Final Office Action mailed Jul. 22, 2015, 13 pgs.

U.S. Appl. No. 13/956,228, Notice of Allowance mailed Jun. 13, 2016, 8 pgs.

* cited by examiner

SETTINGS MANAGEMENT OF AN ONLINE SERVICE

CROSS-REFERENCE TO RELATED APPLICATIONS

This application is a continuation-in-part of and claims priority to U.S. patent application Ser. No. 13/956,228, filed on Jul. 31, 2013, and entitled, "SETTINGS MANAGEMENT OF AN ONLINE SERVICE," which claims priority to U.S. Provisional Application No. 61/860,146, filed on Jul. 30, 2013, and entitled "METHODS AND SYSTEMS OF SETTINGS MANAGEMENT," each of which is hereby incorporated by reference in its entirety as if set forth herein.

TECHNICAL FIELD

The present application relates generally to data processing systems and, in one specific example, to methods and systems of managing settings for a user's membership on an online service.

BACKGROUND

Social network sites and other web sites allow a user to adjust certain settings. However, current settings pages suffer from poor visibility and actionable ability on behalf of the user. A lot of settings that a user may want to adjust are not readily apparent or easily identifiable as to what these settings actually are and how they may affect the user. Therefore, finding settings and determining their meaning can be difficult.

BRIEF DESCRIPTION OF THE DRAWINGS

Some embodiments are illustrated by way of example and not limitation in the figures of the accompanying drawings in which.

DETAILED DESCRIPTION

Figure 1:
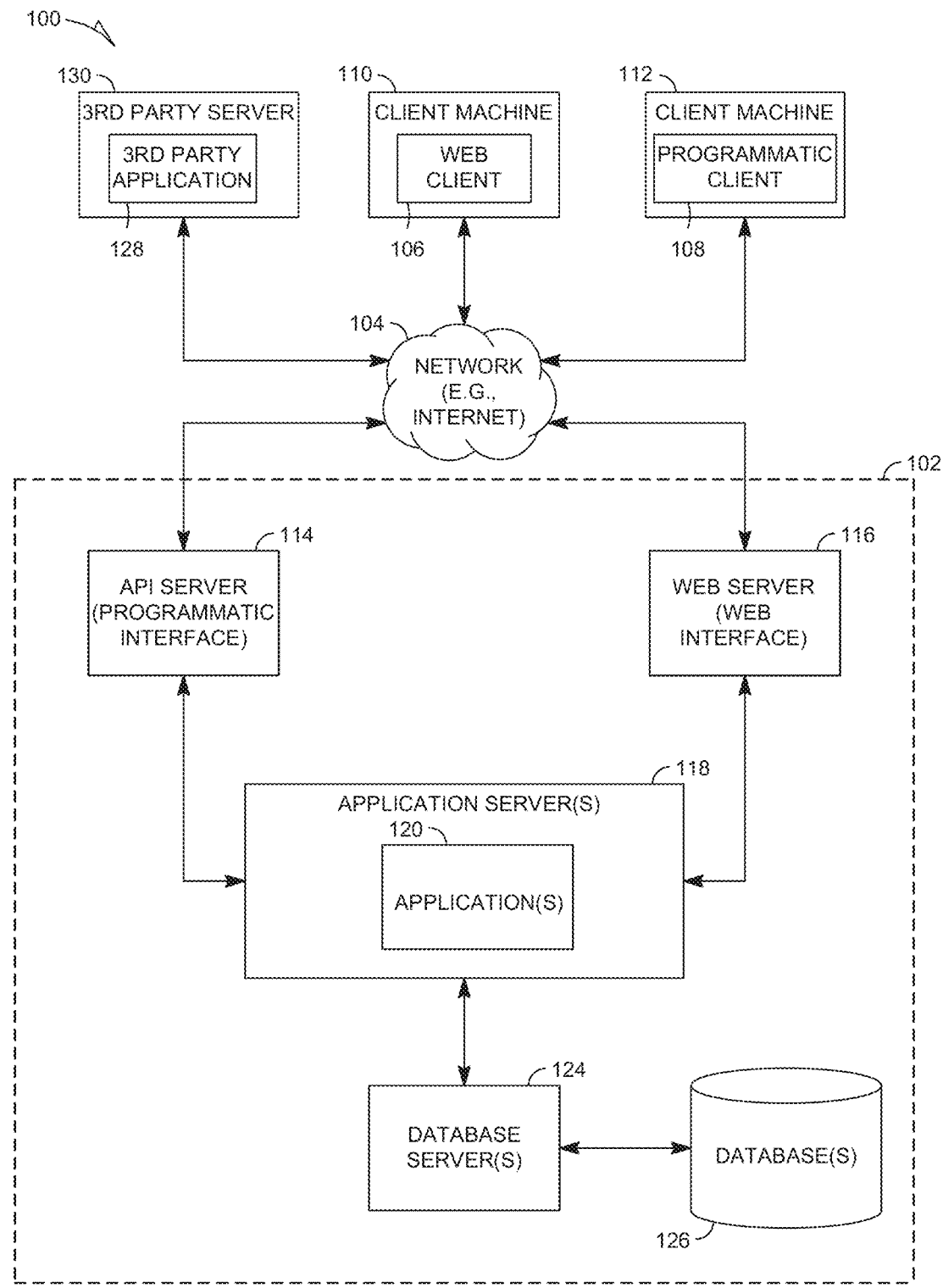
FIG. 1 is a block diagram illustrating a client-server system, in accordance with an example embodiment.

Example methods and systems of managing settings for a user's membership on an online service are described. In the following description, for purposes of explanation, numerous specific details are set forth in order to provide a thorough understanding of example embodiments. It will be evident, however, to one skilled in the art that the present embodiments may be practiced without these specific details.

The present disclosure provides several advancements in settings management. The techniques disclosed herein improve the visibility and actionability of settings. The settings and user choices of those settings disclosed herein may be changeable and fixable, and therefore may evolve over time rather than being fixed after an initial configuration.

In some embodiments, a method comprises determining a legal jurisdiction associated with a user of an online service, and then causing, by at least one processor, a settings page corresponding to settings of the user on the online service to be displayed on a device. The settings page can comprise selectable category setting options for a setting category. The setting category can have a plurality of subcategories, and each subcategory can have its own selectable subcategory setting options. Each one of the category setting options can correspond to its own distinct configuration of subcategory setting options for its subcategories, and each subcategory setting option for each of the plurality of subcategories can be displayed and available for selection across all configurations of the category setting options. One of the selectable category setting options can be preselected for the user based on the legal jurisdiction associated with the user. A user input indicating a selection of one of the category setting options for the setting category can be received, and the configuration of subcategory setting options corresponding to the selected one of the category setting options for the setting category can be applied to the user's settings on the online service.

In some embodiments, the legal jurisdiction is determined based on one or more of an Internet Protocol (IP) address associated with the device, a media access control (MAC) address associated with the device, global positioning system (GPS) location information associated with the device, or profile information of the user. However, it is contemplated that the legal jurisdiction can be determined in other ways as well.

In some embodiments, the online service comprises a social network service. However, it is contemplated that other online services are also within the scope of the present disclosure, including, but not limited to, content sharing sites (e.g., photo- or video-sharing sites) and any other online services that allow users to have a profile and present themselves or content to other users.

The user's settings may correspond to the user's membership on the online service. Such membership settings may relate to issues of participation, visibility, sharability, and accessibility, as well as a variety of other issues as well. The settings may apply to a user, or to a piece of content or conversation. In some embodiments, the settings may apply to a group of users, where a single user may adjust the settings for the group of users (e.g., one user deciding how public the activities and membership of the group should be within the online service).

In some embodiments, the method further comprises receiving, from the user, an indication to assign a customized configuration of subcategory setting options for the subcategories of the setting category to one of the category setting options for the setting category, and assigning the customized configuration of subcategory setting options for the subcategories of the setting category to the one of the category setting options for the setting category based on the indication from the user.

In some embodiments, the settings page further comprises at least one graphical user interface element configured to enable the user to indicate the selection of one of the category setting options for the setting category. In some embodiments, the graphical user interface element(s) comprise a slider.

In some embodiments, the method further comprises causing to be displayed on the device a preview of an effect of at least one of the subcategory setting options being applied to the user's membership on the online service. The preview may be caused to be displayed on the device in response to a selection by the user of the at least one of the subcategory setting options and prior to the application of the at least one of the subcategory setting options to the user's membership.

In some embodiments, the method may further comprise causing to be displayed on the device, subsequent to the configuration of subcategory setting options being applied to the user's membership, information regarding a difference between the configuration of subcategory setting options being applied to the user's membership and the configuration of subcategory setting options not being applied to the user's membership.

In some embodiments, the method further comprises determining a configuration of subcategory setting options to be assigned to one of the category setting options based on configurations of corresponding subcategory setting options for other users of the online service. In some embodiments, the other users are determined based on a similarity between profile information of their profiles with the corresponding profile information of the user's profile. In some embodiments, the profile information comprises at least one of work-related information, skill-related information, interest-related information, activity-related information, and education-related information. In some embodiments, the method further comprises automatically assigning the determined configuration of subcategory setting options to the one of the category setting options.

In some embodiments, a configuration of subcategory setting options or changes to subcategory setting options may be determined and recommended to a user based on the user's activity within the online service. For example, if it is determined that a user has been searching for a new job online or has indicated that he or she is looking for a new job (e.g., via a status setting on the user's profile), a more public setting (as opposed to a private setting) may be determined and recommended for the user. In another example, if it is determined that a user has a profession that requires discretion, then a more private setting may be determined and recommended for the user. In yet another example, if it is determined that a user is close to his or her graduation date, then it may be assumed that the user is likely to be looking for a job and would prefer more public settings for job searches. In yet another example, if it is determined that a user has set his or her relationship status as "single," the it may be determined that the user is more inclined to have less private settings than a user who just set his or her relationship status to "engaged." It is contemplated that other examples of settings being based on user activity within the online service are also within the scope of the present disclosure.

In some embodiments, the method further comprises determining a proposed subcategory setting option for the user based on a corresponding subcategory setting option for other users of the online service, causing a recommendation of the proposed subcategory setting option to be displayed on the device, receiving a user input instructing application of the proposed subcategory setting option to the user's membership on the online service, and applying the proposed subcategory setting option to the user's membership on the online service in response to receiving the user input instructing application.

In some embodiments, the method further comprises receiving a situation-based selection from the user, the situation-based selection indicating that the selected category setting option or at least one of the selected subcategory setting options should be used in a specific situation, and using, based on the situation-based selection, the selected category setting option or the at least one of the selected subcategory setting options for the user's membership during the specific situation. In some embodiments, the specific situation is when the user's membership on the online service is being engaged via a mobile device. In some embodiments, the specific situation is based on the user's location.

In some embodiments, the setting category comprises privacy-related settings or communications-related settings. It is contemplated that other settings are also within the scope of the present disclosure, including, but not limited to, general visibility-related settings, settings related to whether a user or group of users is open to new connections, settings related to whether a user or group of users is open to commercial opportunities, and settings related to whether a user or group of users is open to sharing data or content.

In some embodiments, the method may further comprise receiving a search query from the user via a webpage of the online service, determining one or more setting categories or setting subcategories related to the search query in response to receiving the search query, and causing the determined one or more setting categories or setting subcategories related to the search query to be displayed to the user in response to determining the one or more setting categories or setting subcategories related to the search query. In some embodiments, the method may further comprise causing selectable category setting options or selectable subcategory setting options corresponding to the determined one or more setting categories or setting subcategories related to the search query to be displayed to the user based on the search query.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
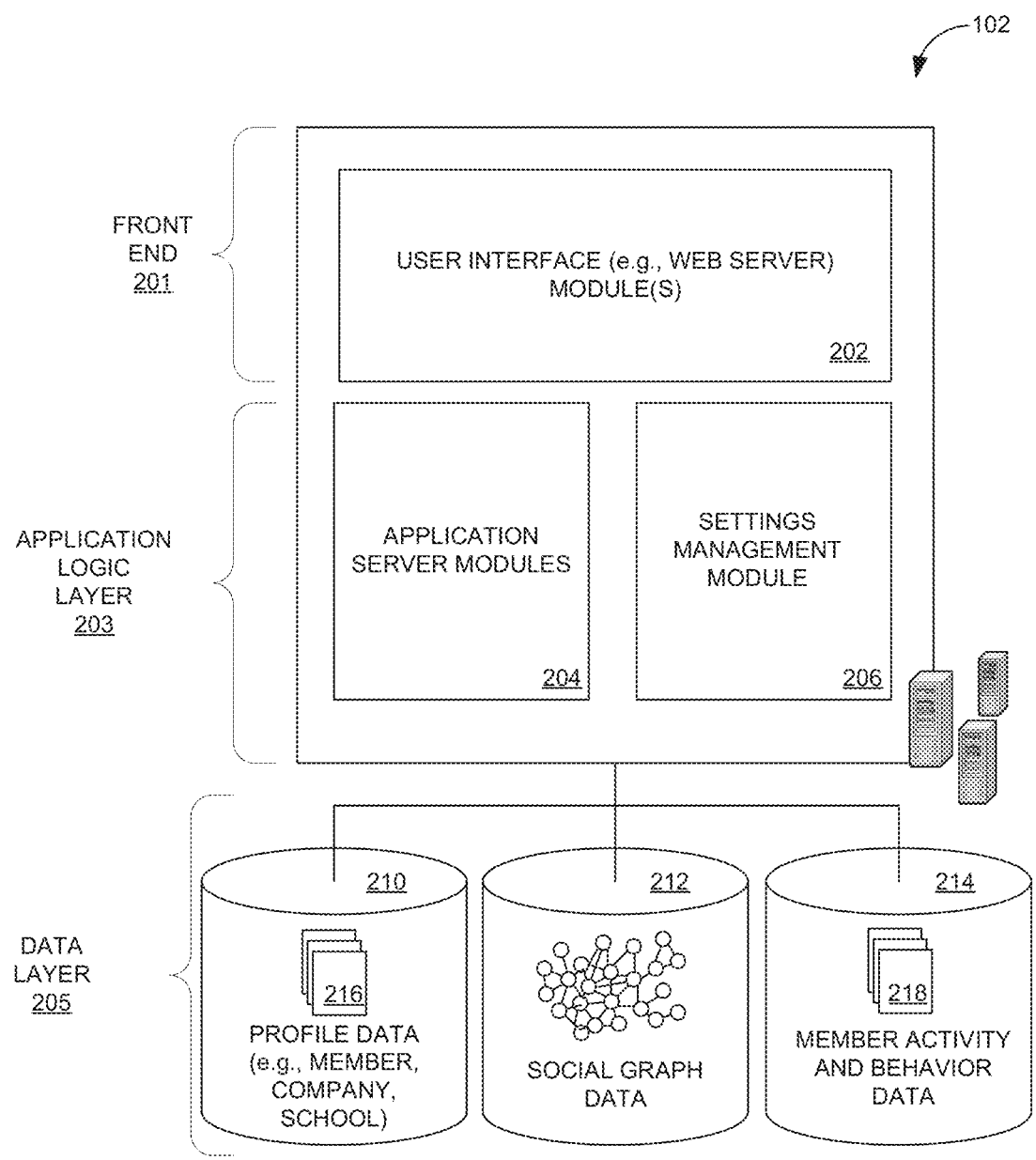
FIG. 2 is a block diagram showing the functional components of a social network service within a networked system, in accordance with an example embodiment.

In some embodiments, the networked system 102 may comprise functional components of a social network service. FIG. 2 is a block diagram showing functional components of a social network service within the networked system 102, in accordance with an example embodiment. As shown in FIG. 2, the social network service may be based on a three-tiered architecture, consisting of a front end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a social network system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a social network service is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front end layer 201 comprises a user interface module (e.g., a web server) 202, which receives requests from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the social network service, the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the social network service. These settings may comprise various categories, including, but not limited to, privacy and communications. Each category may have its own set of settings that a member may control.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained within a social graph database 212.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information 218 concerning the member's activities and behavior may be stored, for example, as indicated in FIG. 2 by the database 214. This information 218 may be used to classify the member as being in various categories. For example, if the member performs frequent searches of job listings, thereby exhibiting behavior indicating that the member is a likely job seeker, this information 218 can be used to classify the member as a job seeker. This classification can then be used as a member profile attribute for purposes of enabling others to target the member for receiving messages or status updates.

In some embodiments, the social network service provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., a smartphone, or tablet computing devices) having a mobile operating system.

The data and information (e.g., profile data 216 and member activity and behaviour data 218) in the data layer 205 may be accessed, used, and adjusted by the settings management module 206, as will be described in more detail below in conjunction with FIGS. 3A-12. Although the settings management module 206 is referred to herein as being used in the context of a social network service, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure.

Figure 3A:
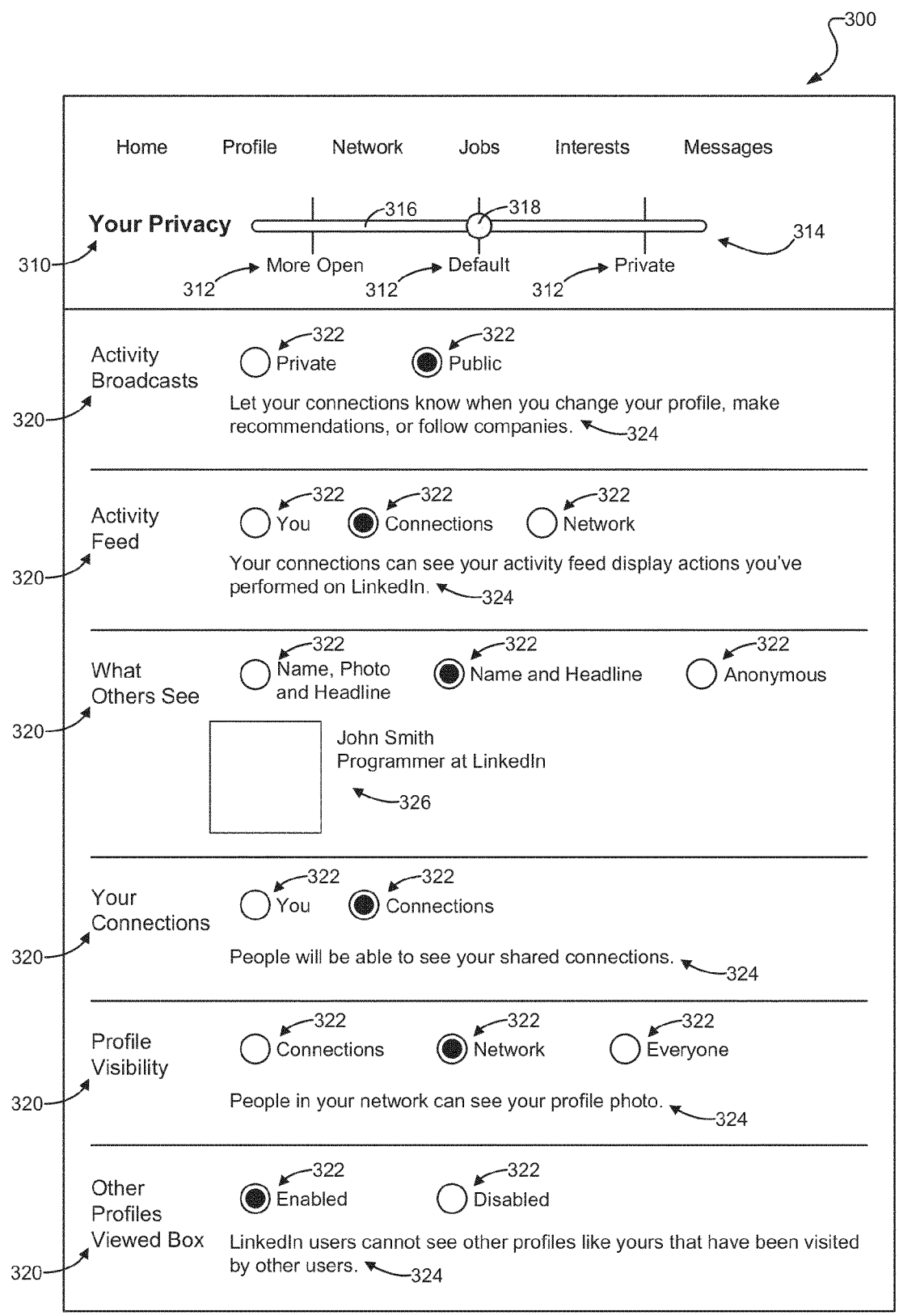
FIG. 3A illustrates a user interface in which one category setting option has been selected, in accordance with an example embodiment.

In some embodiments, the settings management module 206 may be configured to enable a user to adjust multiple settings within a single category of settings via a single selection of a setting option. FIG. 3A illustrates a user interface 300 for a settings page on a social network website, in which one category setting option 312 has been selected for a single setting category 310, in accordance with an example embodiment. The settings information and options referred to on the settings page may correspond to a user's membership (e.g., profile, account, etc.) on the social network website. Examples of settings categories 310 include, but are not limited to, privacy and communications. It is contemplated that other settings categories 310 are also within the scope of the present disclosure. Each setting category 310 may have its own set of one or more subcategories 320 such that these subcategories 320 fall within and are related to that setting category 310. For example, in FIG. 3A, the setting category 310 "Your Privacy" has a plurality of subcategories 320: Activity Broadcasts, Activity Feed, What Others See, Your Connections, Profile Visibility, and Other Profiles Viewed Box.

Each subcategory 320 may have its own set of selectable subcategory setting options 322. The user may configure the setting of a subcategory 320 by selecting one of its subcategory setting options 322. In one example, a user may configure the setting for the "What Others See" subcategory 320. As seen in FIG. 3A, the subcategory setting options 322 from which the user may choose are "Name, Photo and Headline," "Name and Headline," and "Anonymous." Other examples are provided as well. In FIG. 3A, the user may select the subcategory setting options 322 via selectable radio buttons. However, it is contemplated that other graphical user interface (GUI) elements may also be employed to enable a user to select subcategory setting options 322.

Each setting category 310 may have selectable category setting options 312. The user may configure the setting of a category 310 by selecting one of its category setting options 312. In FIG. 3A, the user may select the category a category setting option 312 using a GUI slider 314, which may comprise an indicator 318 that may be moved along a track bar 316 in order to change from one category setting option 312 to another. Employment of the GUI slider 314 may help users visualize the meaning of the different category setting options 312. However, it is contemplated that other GUI elements may also be employed to enable a user to select category setting options 312.

Each category setting option 312 may correspond to its own distinct configuration of subcategory setting options 322. For example, in FIG. 3A, the category setting option 312 of "Default" for setting category 310 "Your Privacy" corresponds to the following configuration of subcategory setting options 322 for their respective subcategories 320:

Activity Broadcasts: Public
Activity Feed: Connections
What Other See: Name and Headline
Your Connections: Connections
Profile Visibility: Network
Other Profiles Viewed Box: Enabled In some embodiments, the user can change the settings for multiple subcategories 320 without having to make each individual change (e.g., multiple selections of subcategory setting options across each subcategory 320) by making a single selection of a different category setting option 312. For example, in FIG. 3B, the user has changed the setting of the "Your Privacy" setting category 310 to "Private" using the slider 314. As a result, the following configuration of subcategory setting options 322 is reflected:

Activity Broadcasts: Private
Activity Feed: You
What Other See: Anonymous
Your Connections: You
Profile Visibility: Connections
Other Profiles Viewed Box: Disabled By assigning a configuration of multiple subcategory setting options 322 to a single category setting option 312, the settings management module 206 may provide the user with a more intuitive way of changing settings. In the example of the "Your Privacy" setting category 310 in FIGS. 3A-B, the user does not have to go through each subcategory 320 to figure out the most appropriate subcategory setting option 322 for a particular situation. If the user wants more privacy, then the user can make a single selection of the "Private" category setting option 312. If the user does not want much privacy at all, but rather more openness associated with his or her membership, then the user can make a single selection of the "More Open" category setting option 312. If the user wants privacy that falls between private and more openness, then the user can make a single selection of the "Default" category setting option 312.

In some embodiments, selections made by the user may be implemented automatically without the user having to provide confirmation. In some embodiments, the selections made by the user may be implemented automatically only after the user has provided confirmation, such as via a selectable "Save Changes to Settings" button or the like.

In some embodiments, the user may customize the configuration of subcategory setting options 322 that will correspond to a particular category setting option 312. For example, in FIG. 3B, if the user wants the "Private" category setting option 312 to correspond to the "Connections" subcategory setting option 322 for the "Activity Feed" subcategory 320, the user may customize this configuration accordingly. For example, the user may select the "Connections" subcategory setting option 322 for the "Activity Feed" subcategory 320 while the setting category 310 is set to the "Private" category setting option 312. In some embodiments, this change or customization may be implemented automatically without the user having to provide confirmation. In some embodiments, this change or customization may be implemented automatically only after the user has provided confirmation, such as via a selectable "Save Customized Settings" button or the like.

In some embodiments, the settings management module 206 is configured to enable the user to customize the configurations of the subcategory setting options 322 for the corresponding category setting option 312, as described above. This customization may be performed during the initial setup of the user's membership on the social network service or anytime thereafter.

In some embodiments, the settings management module 206 may be configured to enable the user to configure his or her settings so that certain category setting options or certain subcategory setting options are used in certain situations, while other category setting options or subcategory setting options are used in other situations. For example, the user may prefer to have one configuration of settings for situations where the user's membership on the social network service is being engaged via a mobile device (e.g., a smart phone, tablet computing devices), and a different configuration of settings for situations where the user's membership on the social network service is being engaged via a non-mobile device (e.g., a desktop computer). The user may also prefer to have a configuration of settings be used based on the location of the user and/or people who are attempting to engage the user's membership on the social network service. For example, the user may want to have a "More Open" privacy setting be applied for people that are in the same room or at the same conference, while having a "Private" privacy setting for every other location scenario. The settings management module 206 may provide users with selection options configured to implement such situation-based setting options.

In some embodiments, the settings management module 206 is configured to automatically determine and set the subcategory setting options 322. This automatic determination and application of the subcategory setting options 322 may be performed during the initial setup of the user's membership on the social network service or anytime thereafter. In one example, the settings management module 206 may automatically determine and apply the initial subcategory setting options 322 for a user. The user may subsequently make changes to these settings. The settings management module 206 may then automatically determine better settings for the user and either implement those settings or recommend them to the user. In some embodiments, the settings management module 206 may be configured to automatically determine the subcategory setting options 322, and then provide a recommendation of those determined subcategory setting options 322 to a user for confirmation of their application. The settings management module 206 may then apply those determined subcategory setting options 322 in response to an indication of confirmation from the user.

In some embodiments, the settings management module 206 is configured to determine one or more setting options to be applied based on the settings of other users of the social network service, information on which may be stored in one or more databases (e.g., database 210 in FIG. 2). This determination may be made based on similarities of profile information between the other users and the user for whom the setting options are being determined. In some embodiments, the profile information may comprise at least one of work-related information (e.g., job title, employer), skill-related information (e.g., certifications), interest-related information (e.g., what user is interested in), activity-related information (e.g., history of use of social network service), and education-related information (e.g., education level, type of degree, major). In one example, if the user is a CEO of a large company, the settings management module 206 may determine that certain subcategory setting options 322 should be applied based on the subcategory setting options 322 of other CEO's of large companies.

Figure 4:
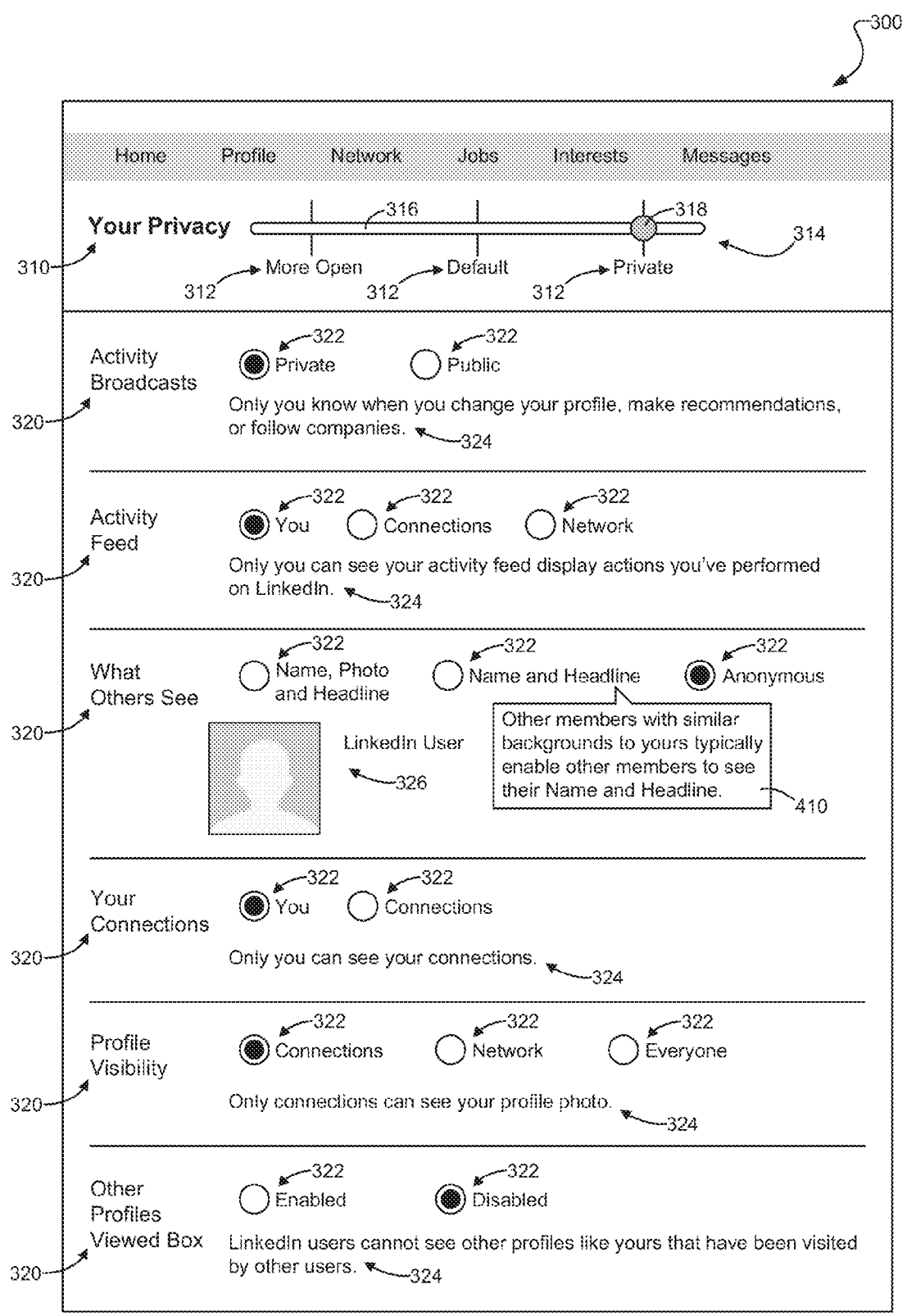
FIG. 4 illustrates a user interface in which a recommendation of a proposed setting option, in accordance with an example embodiment.

The settings management module 206 may be configured to determine one or more subcategory setting options 322 for a user. The settings management module 206 may also be configured to determine a configuration of subcategory setting options 322 to be assigned to one of the category setting options 312 for the user. The settings management module 206 may also be configured to determine a category setting option 312 for the user. In some embodiments, the settings management module 206 may be configured to automatically implement the determined subcategory setting option(s) 322, the determined configuration of subcategory setting options 322, and/or the determined category setting option 312 without the user's approval. In some embodiments, the settings management module 206 may be configured to provide a recommendation of the determined subcategory setting option(s) 322, the determined configuration of subcategory setting options 322, and/or the determined category setting option 312 to the user so that the user may decide whether or not to implement the recommendation. FIG. 4 illustrates a recommendation 410 of a proposed setting option (Name and Headline, instead of Anonymous) being provided.

Figure 3B:
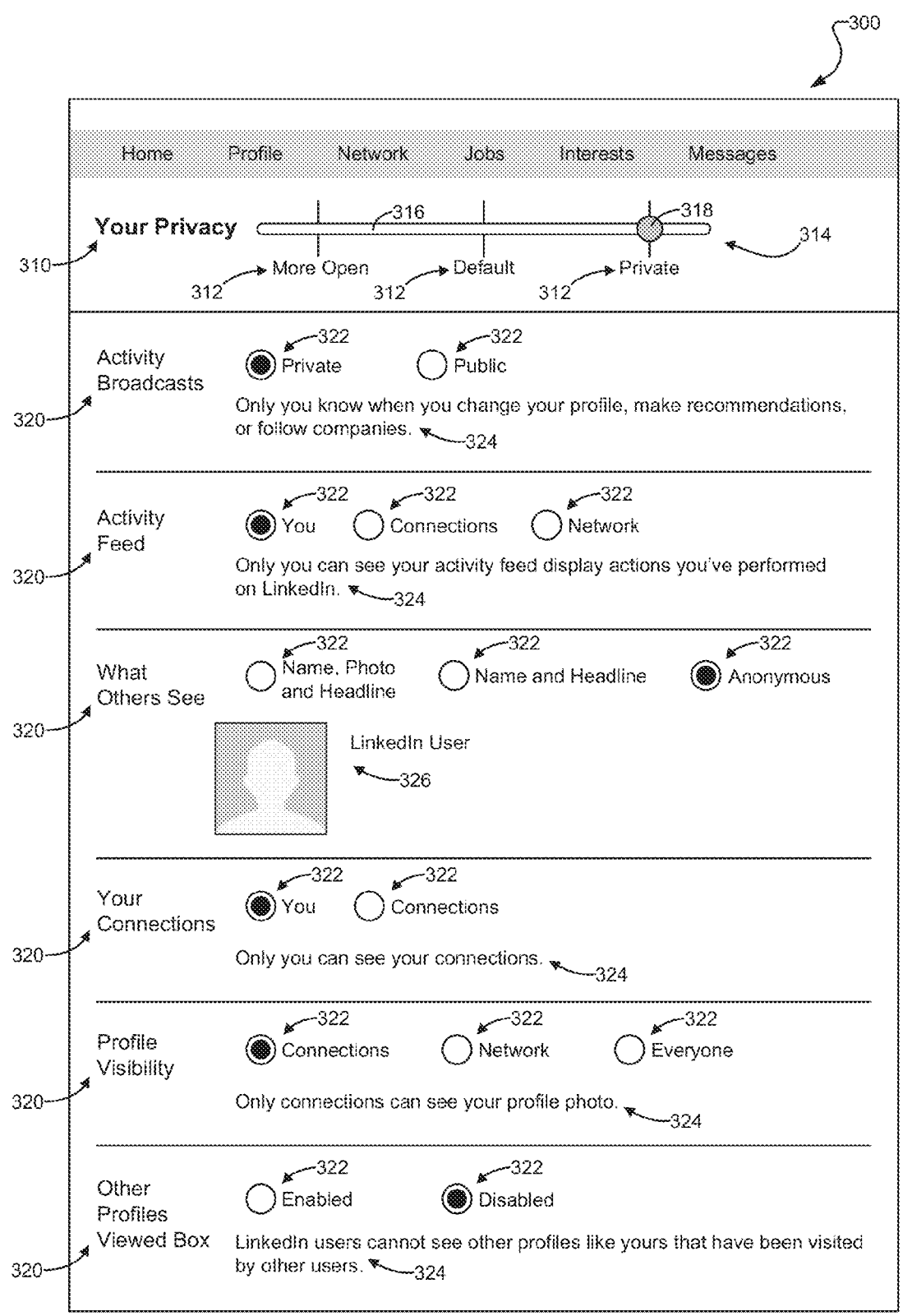
FIG. 3B illustrates a user interface in which another category setting option has been selected, in accordance with an example embodiment.

In some embodiments, the settings management module 206 may be configured to provide information 324 describing or explaining the currently selected subcategory setting options 322. In some embodiments, the settings management module 206 may be configured to provide a preview 326 of an effect of at least one of the subcategory setting options being applied to the user's membership on the social network service. The information 324 and/or the preview 326 may be provided in response to a selection by the user of the corresponding subcategory setting option 322. As seen in FIGS. 3A-3B, the user is provided with a preview 326 of what other people will see when viewing that user's profile. For example, under the "Default" category setting option 312, other people will be able to see the user's name and job title (e.g., John Smith, Programmer at LinkedIn) with an empty picture slot, whereas under the "Private" category setting option 312, other people will only be able to see that the user is a user of the social network service (e.g., LinkedIn User) with an empty picture slot.

Figure 5:
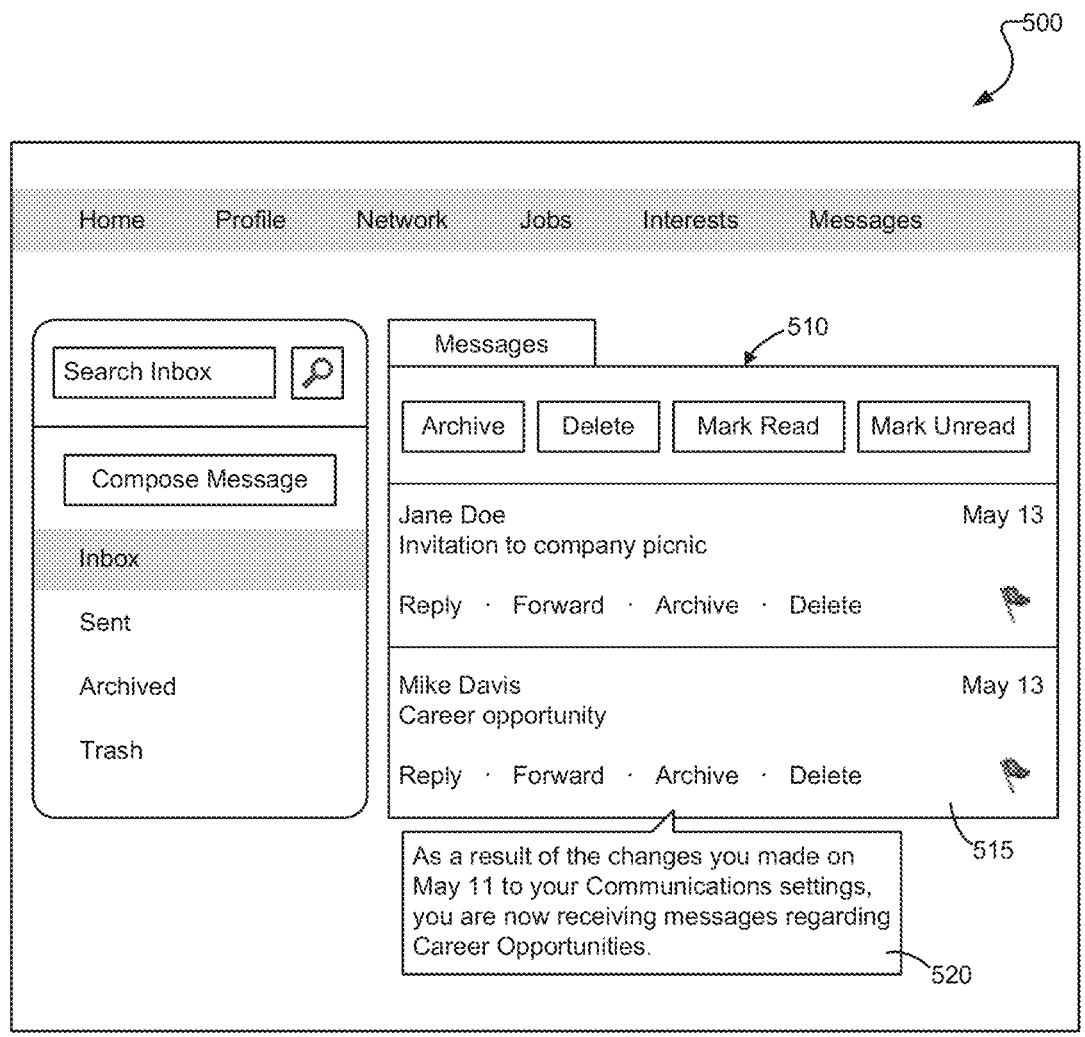
FIG. 5 illustrates a user interface in which information regarding a difference between a setting option being applied and not being applied, in accordance with an example embodiment.

In some embodiments, the settings management module 206 may also be configured to provide, subsequent to the configuration of subcategory setting options being applied, information regarding a difference between the current and previous setting options for a setting category 310 or a setting subcategory 320. FIG. 5 illustrates a user interface 500 in which information 520 regarding the effect of changing a setting related to communications is displayed, in accordance with an example embodiment. In this example, the user made a change to his or her communications settings on May 11 that resulted in the user receiving a message regarding career opportunities. Here, this information 520 is provided next to the message 515 in the user's inbox 510. It is contemplated that the information 520 explaining the effect of a change in a user's settings may be provided in a variety of ways other than that shown in FIG. 5.

It is contemplated that certain issues may arise regarding settings of an online service depending on what laws are applicable. Such laws can be based on the location of the user and can vary depending on the applicable country, territory, state, region, county, or city, as well as other distinguishing geographic identifications. For example, laws regarding privacy settings in the United States may be different from laws regarding privacy settings in Germany. Similarly, the laws regarding communication settings in California may be different from laws regarding communication settings in Michigan. Accordingly, the settings management module 206 can be configured to customize the settings page for a legal jurisdiction associated with the user. This customization feature for legal jurisdictions can help the online service comply with the appropriate laws of geographic locations in which its services are being accessed.

The settings management module 206 can determine a legal jurisdiction associated with the user. The legal jurisdiction can be determined based on one or more of an IP address associated with the user or a device of the user, a MAC address associated with the user or a device of the user, GPS location information associated with the user or a device of the user, or profile information of the user (e.g., address information that has been stored as part of the user's profile information). However, it is contemplated that the legal jurisdiction can be determined in other ways as well.

The settings management module 206 can use the determined jurisdiction to determine what setting categories 310 to present to the user, what category setting options 312 to present to the user, what subcategories 320 to present to the user, or what subcategory setting options 322 to present to the user. In some embodiments, the settings management module 206 is configured to select one of the category setting options 312 as a preselected default setting to apply to the user's settings and to present to the user based on the legal jurisdiction associated with the user. In this manner, a default category setting option 312 can be determined and preselected for the user. Additionally, a configuration of default subcategory setting options 322 for that default category setting option 312 can be determined and preselected for the user. For example, in FIG. 3A, the category setting option 312 of "Default" can be set as a preselected default setting for the user based on a determined legal jurisdiction of the user. Additionally, the configuration of the subcategory setting options 322 (e.g., "Public", "Connections", "Name and Headline") shown in FIG. 3A for the category setting option 312 of "Default" can also be set as preselected default settings for the category setting option 312 of "Default" for that user based on the determined legal jurisdiction of the user. The same category setting option 312 of "Default" can have a different configuration of preselected default subcategory setting options 322 based on a change in the determined legal jurisdiction of the same user (e.g., the same user is accessing the online service from a different jurisdiction) or based on a different user in a different legal jurisdiction accessing the online service.

Figure 6:
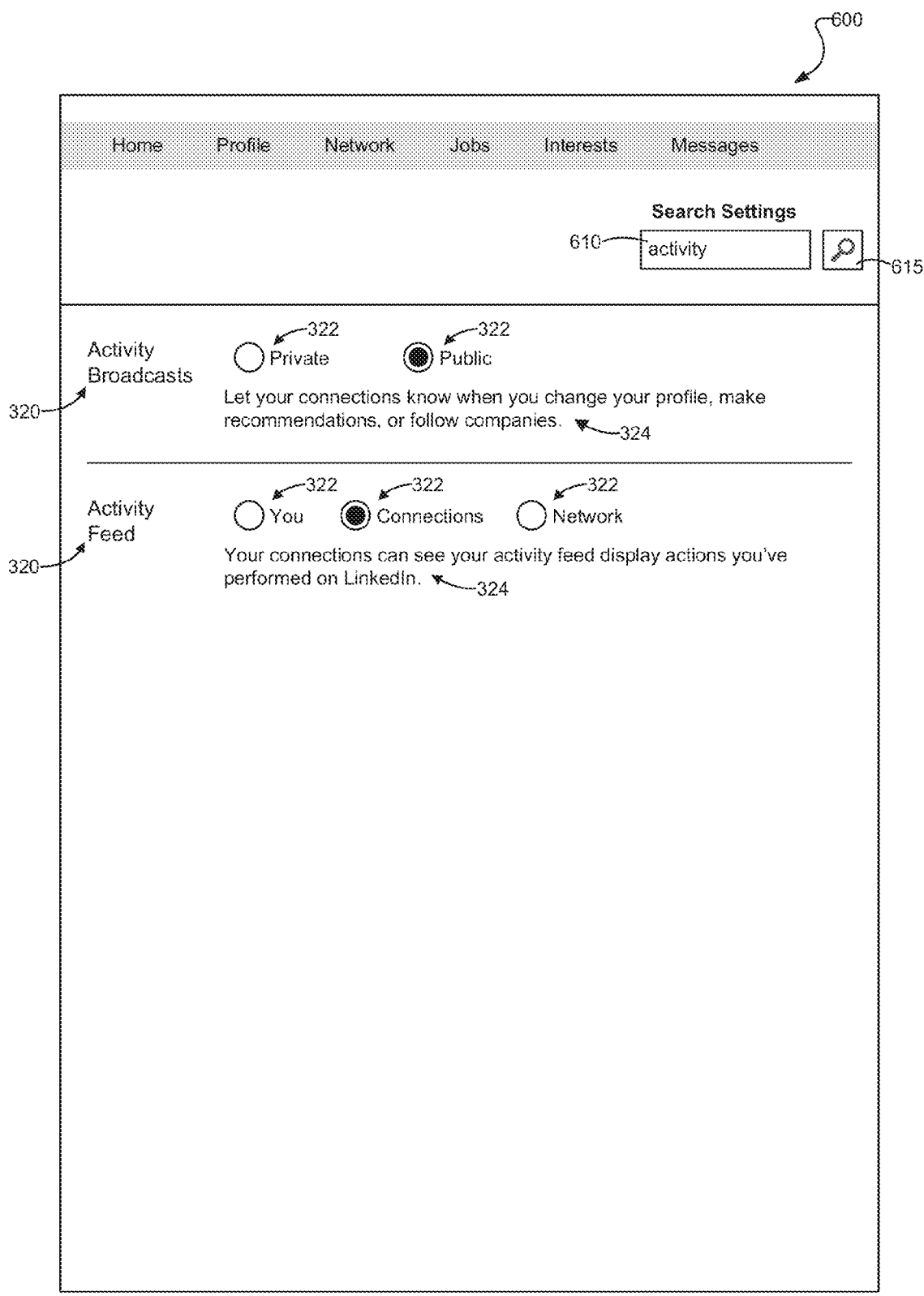
FIG. 6 illustrates a user interface in which settings may be searched, in accordance with an example embodiment.

The settings management module 206 may also be configured to enable a user to search for settings. FIG. 6 illustrates a user interface 600 in which settings may be searched, in accordance with an example embodiment. In some embodiments, the settings management module 206 may be configured to receive a search query from the user (e.g., via a search box 610 and search button 615 on a webpage of the social network service), determine one or more setting categories 310 or setting subcategories 320 related to the search query in response to receiving the search query, and provide the setting categories 310 or setting subcategories 320 related to the search query to the user in the form of search results. In some embodiments, the settings management module 206 may be configured to also provide selectable category setting options 312 or selectable subcategory setting options 322 corresponding to the setting categories 310 or setting subcategories 320 related to the search query to the user in the form of search results. In FIG. 6, the user has submitted "activity" as the search query in order to view only activity-related settings. It is contemplated that the setting search feature may be implemented in ways other than those shown in FIG. 6. In some embodiments, the search feature may be used to filter setting categories or subcategories as the user types in the search query. For example, the search results may change as the user is entering the characters of the search query so that the user does not need to complete the entire search query and click a button in order to begin the search or filtering operation.

Figure 7:
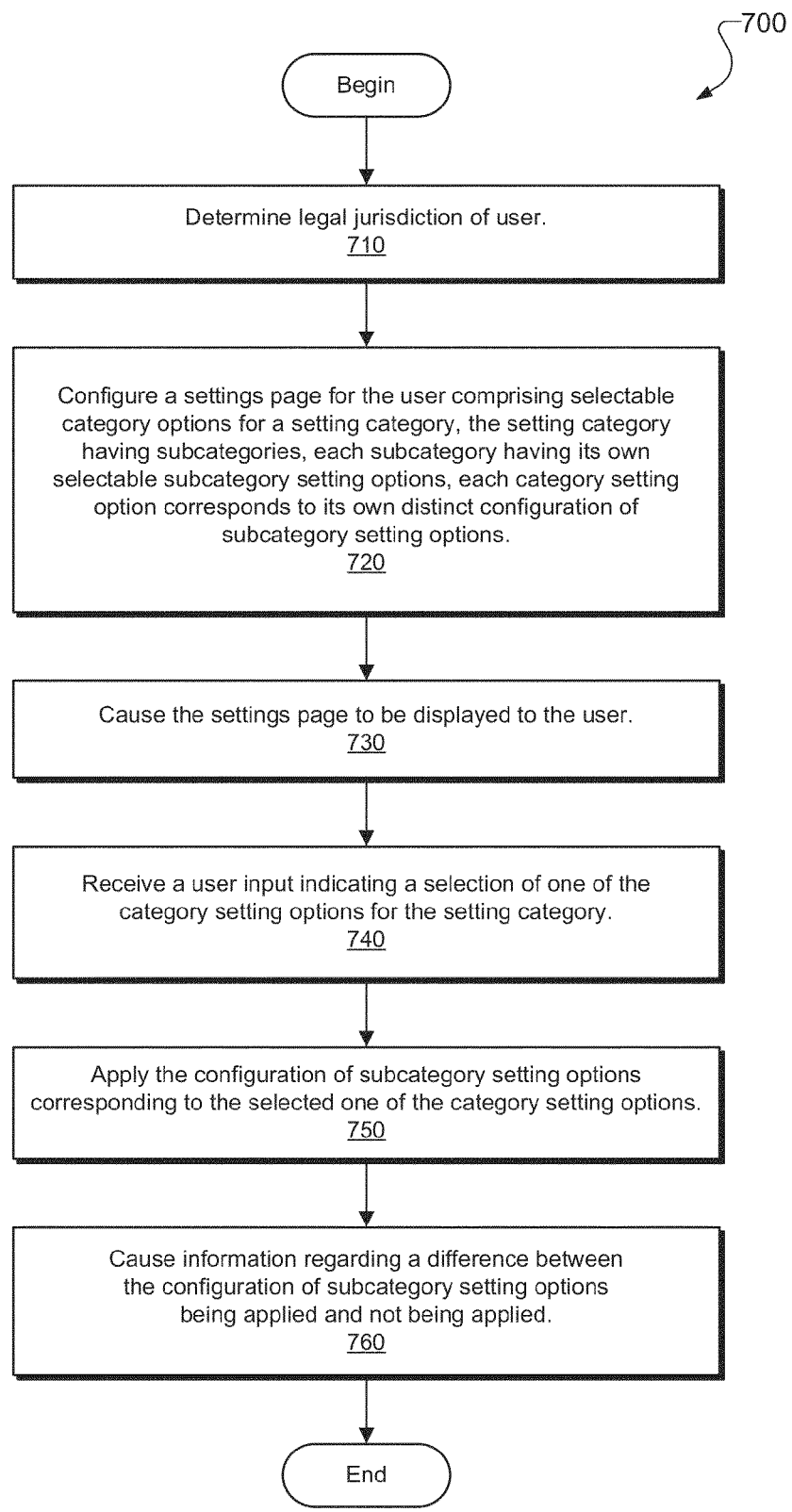
FIG. 7 is a flowchart illustrating a method of managing settings, in accordance with an example embodiment.

FIG. 7 is a flowchart illustrating a method 700 of managing settings, in accordance with an example embodiment. It is contemplated that the operations of method 700 may be performed by a system or modules of a system (e.g., settings management module 206 in FIG. 2). At operation 710, a legal jurisdiction associated with a user of an online service can be determined, as previously discussed. At operation 720, a settings page corresponding to the user's settings on the online service can be configured. The settings page may comprise selectable category setting options for a setting category. The setting category may have a plurality of subcategories, and each subcategory may have its own selectable subcategory setting options. Each one of the category setting options may correspond to its own distinct configuration of subcategory setting options for its subcategories. One or more of the selectable category setting options can be preselected for the user based on the legal jurisdiction associated with the user, as previously discussed. At operation 730, the settings page may be caused to be displayed on a device. At operation 740, a user input indicating a selection of one of the category setting options for the setting category may be received. At operation 750, the configuration of subcategory setting options corresponding to the selected one of the category setting options for the setting category may be applied to the user's settings on the online service. At operation 760, information regarding a difference between the configuration of subcategory setting options being applied to the user's settings and the configuration of subcategory setting options not being applied to the user's settings may be caused to be displayed on a device.

Figure 8:
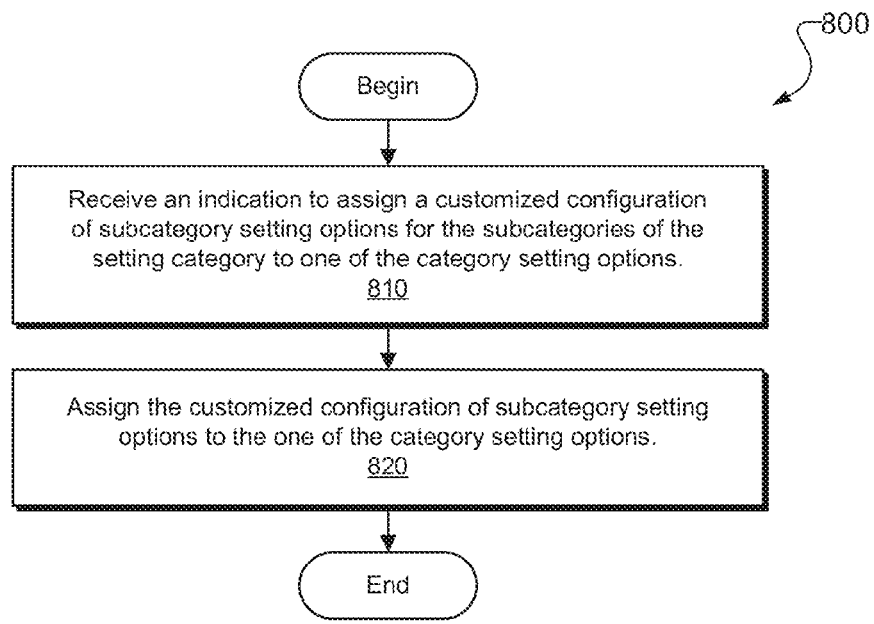
FIG. 8 is a flowchart illustrating a method of enabling a user to customize a configuration of subcategory setting options for a category setting option, in accordance with an example embodiment.

FIG. 8 is a flowchart illustrating a method 800 of enabling a user to customize a configuration of subcategory setting options for a category setting option, in accordance with an example embodiment. It is contemplated that the operations of method 800 may be performed by a system or modules of a system (e.g., settings management module 206 in FIG. 2). At operation 810, an indication to assign a customized configuration of subcategory setting options for the subcategories of the setting category to one of the category setting options for the setting category may be received from a user. At operation 820, the customized configuration of subcategory setting options for the subcategories of the setting category may be assigned to the one of the category setting options for the setting category based on the indication from the user.

Figure 9:
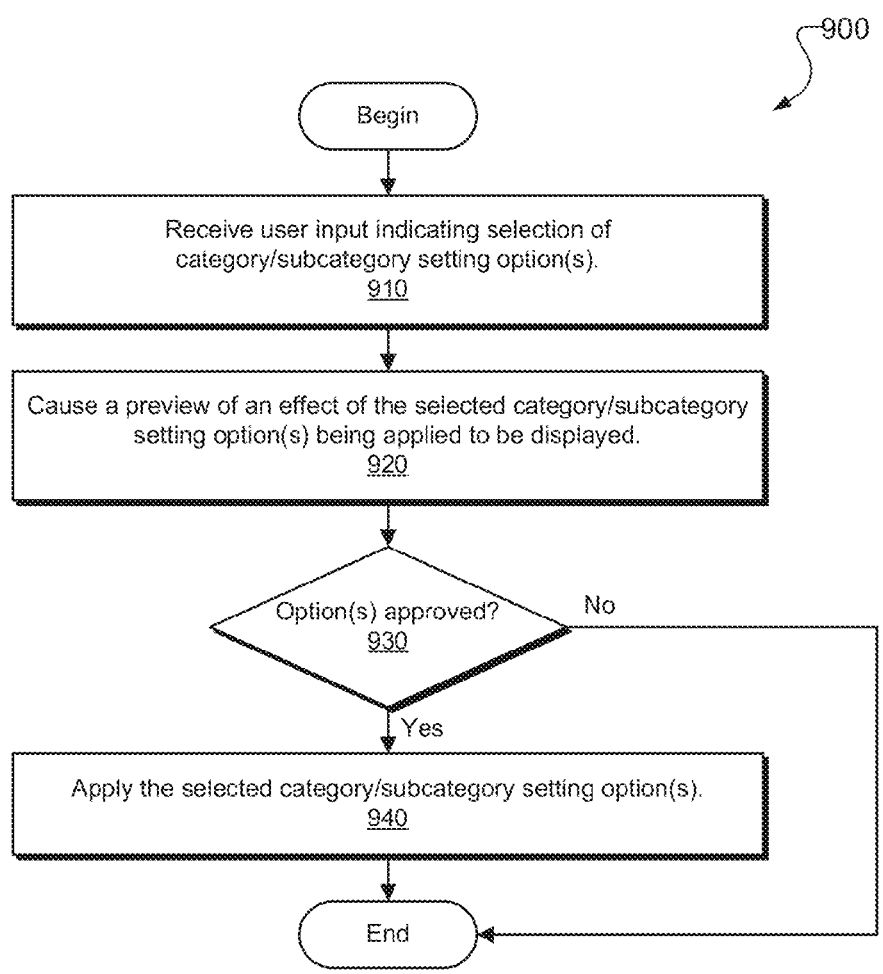
FIG. 9 is a flowchart illustrating a method of providing a preview of an effect of a setting option being applied, in accordance with an example embodiment.

FIG. 9 is a flowchart illustrating a method 900 of providing a preview of an effect of a setting option being applied, in accordance with an example embodiment. It is contemplated that the operations of method 900 may be performed by a system or modules of a system (e.g., settings management module 206 in FIG. 2). At operation 910, a user input indicating a selection of a category setting option or a subcategory setting option may be received. At operation 920, a preview of an effect of the selected category setting option or subcategory setting option being applied to the user's settings on the online service may be caused to be displayed on a device. At operation 930, it may be determined whether or not the user has approved of applying the selected category setting option or subcategory setting option. If the user has not approved of the application of the selected option, then the method may come to an end. If the user has approved of the application of the selected option, then the selected option may be applied to the user's settings at operation 940.

Figure 10:
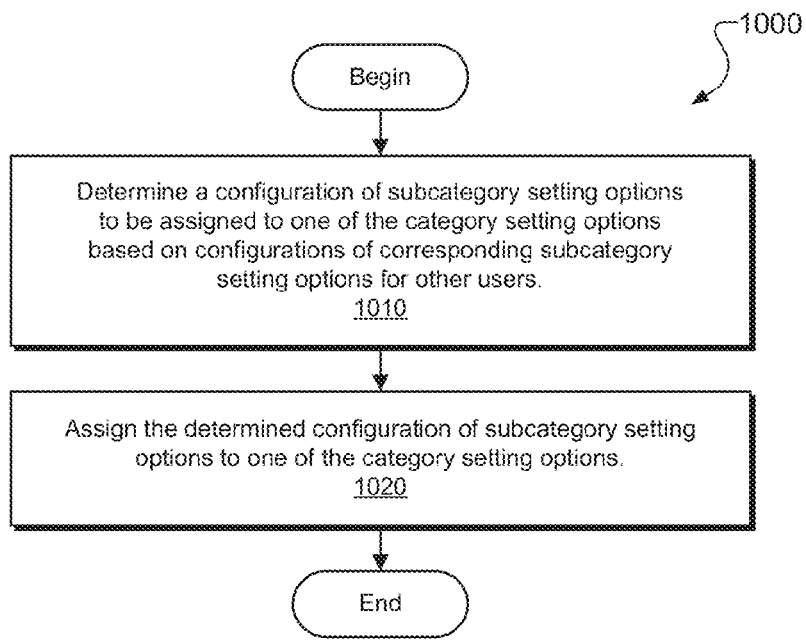
FIG. 10 is a flowchart illustrating a method of adjusting setting options for a user based on setting options of other users, in accordance with an example embodiment.

FIG. 10 is a flowchart illustrating a method 1000 of adjusting setting options for a user based on setting options of other users, in accordance with an example embodiment. It is contemplated that the operations of method 1000 may be performed by a system or modules of a system (e.g., settings management module 206 in FIG. 2). At operation 1010, a configuration of subcategory setting options to be assigned to one of the category setting options may be determined based on configurations of corresponding subcategory setting options for other users of the online service. In some embodiments, the other users are determined based on a similarity between profile information of their profiles with the corresponding profile information of the user's profile. In some embodiments, the profile information comprises at least one of work-related information, skill-related information, interest-related information, activity-related information, and education-related information. At operation 1020, the determined configuration of subcategory setting options may be automatically assigned to the one of the category setting options.

Figure 11:
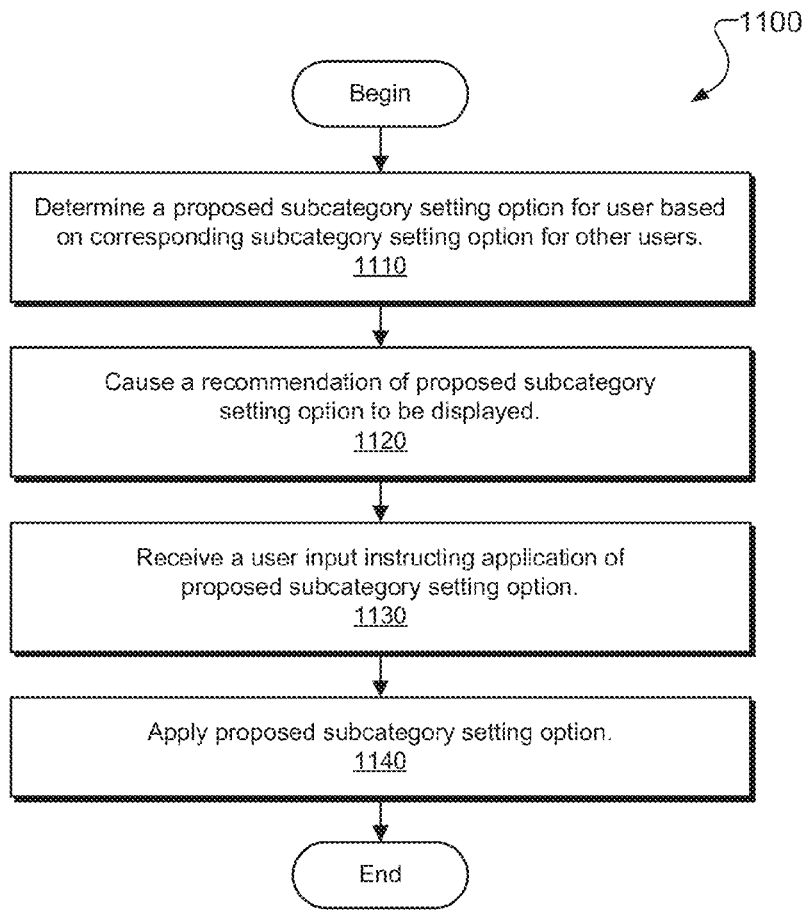
FIG. 11 is a flowchart illustrating a method of providing a recommendation of a proposed setting option, in accordance with an example embodiment.

FIG. 11 is a flowchart illustrating a method 1100 of providing a recommendation of a proposed setting option, in accordance with an example embodiment. It is contemplated that the operations of method 1100 may be performed by a system or modules of a system (e.g., settings management module 206 in FIG. 2). At operation 1110, a proposed subcategory setting option may be determined for the user based on a corresponding subcategory setting option for other users of the online service. At operation 1120, a recommendation of the proposed subcategory setting option may be caused to be displayed on the device. At operation 1130, a user input instructing application of the proposed subcategory setting option to the user's settings on the online service may be received. At operation 1140, the proposed subcategory setting option may be applied to the user's settings on the online service in response to receiving the user input instructing such application.

Figure 12:
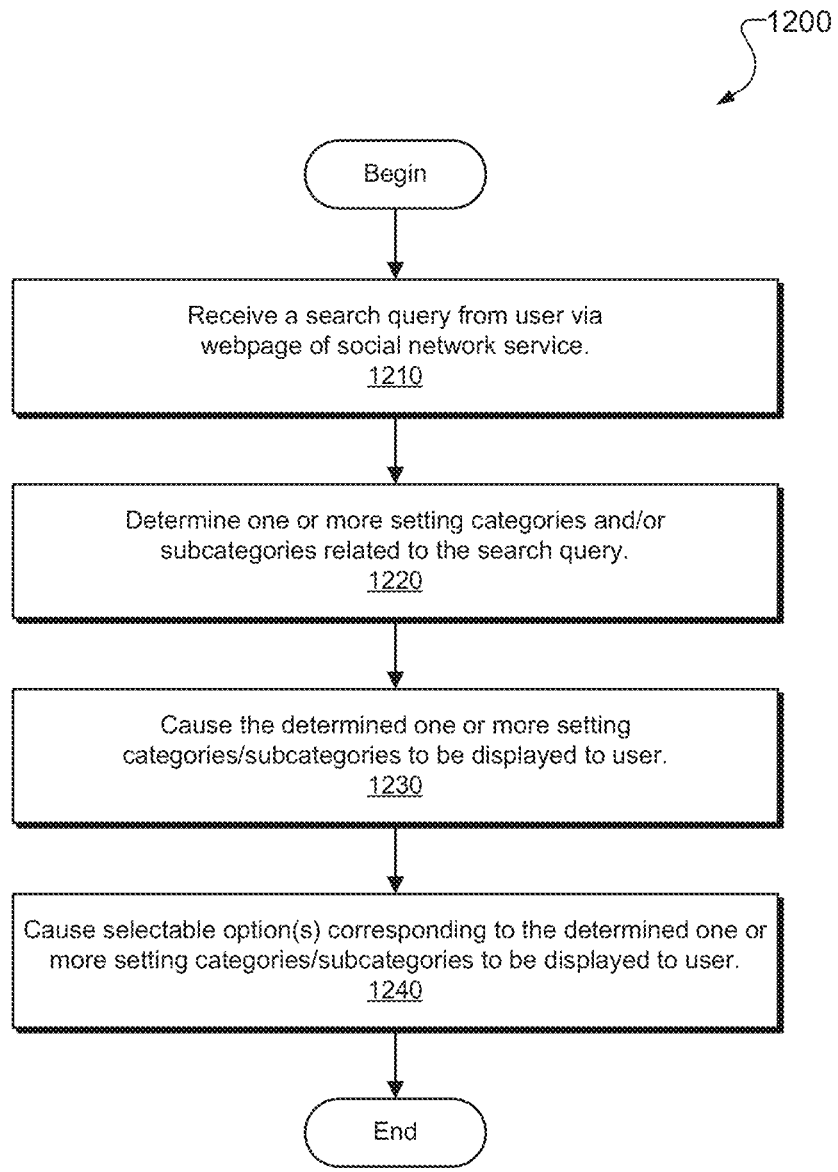
FIG. 12 is a flowchart illustrating a method of enabling a user to search for settings, in accordance with an example embodiment.

FIG. 12 is a flowchart illustrating a method 1200 of enabling a user to search for settings, in accordance with an example embodiment. It is contemplated that the operations of method 1200 may be performed by a system or modules of a system (e.g., settings management module 206 in FIG. 2). At operation 1210, a search query may be received from the user via a webpage of the online service. At operation 1220, one or more setting categories or setting subcategories related to the search query may be determined in response to receiving the search query. At operation 1230, the determined one or more setting categories or setting subcategories related to the search query may be caused to be displayed to the user in response to determining the one or more setting categories or setting subcategories related to the search query. At operation 1240, selectable category setting options or selectable subcategory setting options corresponding to the determined one or more setting categories or setting subcategories related to the search query may be caused to be displayed to the user based on the search query.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
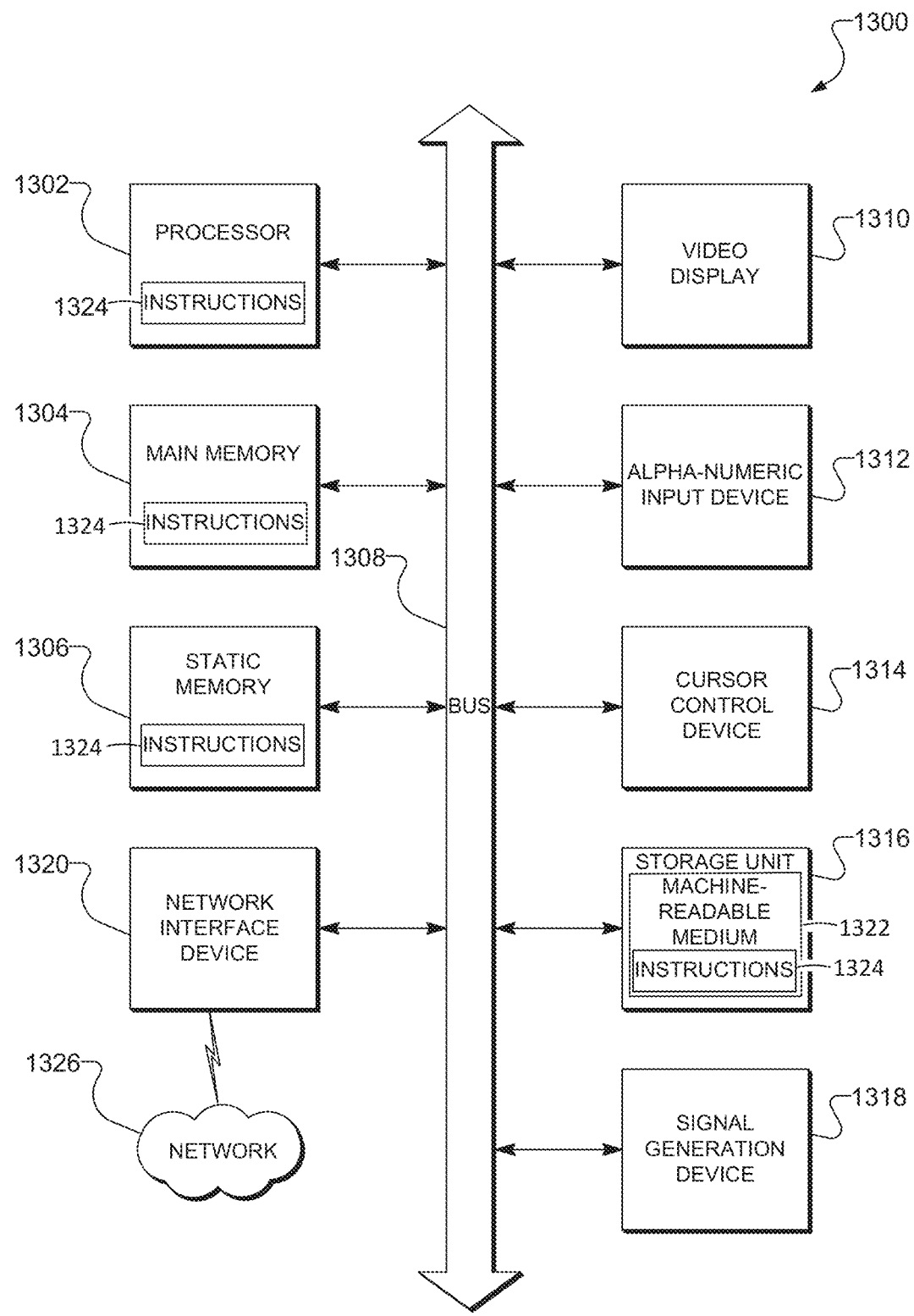
FIG. 13 is a block diagram of an example computer system on which methodologies described herein may be executed, in accordance with an example embodiment.

FIG. 13 is a block diagram of an example computer system 1300 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
  determining a legal jurisdiction associated with a user of an online service;
  causing, by at least one processor, a settings page corresponding to settings of the user on the online service to be displayed on a device, the settings page comprising selectable category setting options for a setting category, the setting category having a plurality of subcategories, and each subcategory having its own selectable subcategory setting options, each one of the category setting options corresponding to its own distinct configuration of subcategory setting options for its subcategories, each subcategory setting option for each of the plurality of subcategories being displayed and available for selection across all configurations of the category setting options, one of the selectable category setting options being preselected for the user based on the legal jurisdiction associated with the user, the selectable category setting options being selectable by the user;
  receiving a user input indicating a selection of one of the category setting options for the setting category;
  applying the configuration of subcategory setting options corresponding to the selected one of the category setting options for the setting category to the user's settings on the online service; and
  determining a configuration of subcategory setting options to be assigned to one of the category setting options based on configurations of corresponding subcategory setting options for other users of the online service.

2. The method of claim 1, wherein the legal jurisdiction is determined based on an Internet Protocol (IP) address associated with the device, a media access control (MAC) address associated with the device, global positioning system (GPS) location information associated with the device, or profile information of the user.

3. The method of claim 1, wherein the online service comprises a social network service, and the user's settings correspond to the user's membership on the social network service.

4. The method of claim 1, further comprising:
  receiving, from the user, an indication to assign a customized configuration of subcategory setting options for the subcategories of the setting category to one of the category setting options for the setting category; and
  assigning the customized configuration of subcategory setting options for the subcategories of the setting category to the one of the category setting options for the setting category based on the indication from the user.

5. The method of claim 1, wherein the settings page further comprises at least one graphical user interface element configured to enable the user to indicate the selection of one of the category setting options for the setting category.

6. The method of claim 1, further comprising causing to be displayed on the device a preview of an effect of at least one of the subcategory setting options being applied to the user's settings on the online service, wherein the preview is caused to be displayed on the device in response to a selection by the user of the at least one of the subcategory setting options and prior to the application of the at least one of the subcategory setting options to the user's settings, wherein the preview of the effect of the at least one of the subcategory setting options being applied to the user's settings on the online service is caused to be displayed on the settings page concurrently with the selectable category setting options, the plurality of subcategories, and the corresponding selectable subcategory setting options for each subcategory.

7. The method of claim 1, further comprising causing to be displayed on the device, subsequent to the configuration of subcategory setting options being applied to the user's settings, information regarding a difference between the configuration of subcategory setting options being applied to the user's settings and the configuration of subcategory setting options not being applied to the user's settings.

8. The method of claim 1, wherein the other users are determined based on a similarity between profile information of their profiles with the corresponding profile information of the user's profile.

9. The method of claim 8, wherein the profile information comprises at least one of work-related information, skill-related information, interest-related information, activity-related information, and education-related information.

10. The method of claim 1, further comprising automatically assigning the determined configuration of subcategory setting options to the one of the category setting options.

11. The method of claim 1, further comprising:
  determining a proposed subcategory setting option for the user based on a corresponding subcategory setting option for other users of the online service;
  causing a recommendation of the proposed subcategory setting option to be displayed on the device;
  receiving a user input instructing application of the proposed subcategory setting option to the user's settings on the online service; and
  applying the proposed subcategory setting option to the user's settings on the online service in response to receiving the user input instructing application.

12. The method of claim 1, further comprising:
  receiving a situation-based selection from the user, the situation-based selection indicating that the selected category setting option or at least one of the selected subcategory setting options should be used in a specific situation; and
  using, based on the situation-based selection, the selected category setting option or the at least one of the selected subcategory setting options for the user's settings during the specific situation.

13. The method of claim 12, wherein the specific situation is when a profile of the user on the online service is being engaged via a mobile device.

14. The method of claim 12, wherein the specific situation is based on the user's location.

15. The method of claim 1, wherein the setting category comprises privacy-related settings or communications-related settings.

16. The method of claim 1, further comprising:
  receiving a search query from the user via a webpage of the online service;
  determining one or more setting categories or setting subcategories related to the search query in response to receiving the search query; and
  causing the determined one or more setting categories or setting subcategories related to the search query to be displayed to the user in response to determining the one or more setting categories or setting subcategories related to the search query.

17. The method of claim 16, further comprising causing selectable category setting options or selectable subcategory setting options corresponding to the determined one or more setting categories or setting subcategories related to the search query to be displayed to the user based on the search query.

18. A system comprising:
a memory;
at least one processor coupled to the memory;
a settings management module, executable by the at least one processor, configured to:
  determine a legal jurisdiction associated with a user of an online service;
  cause a settings page corresponding to settings of the user on the online service to be displayed on a device, the settings page comprising selectable category setting options for a setting category, the setting category having a plurality of subcategories, and each subcategory having its own selectable subcategory setting options, each one of the category setting options corresponding to its own distinct configuration of subcategory setting options for its subcategories, each subcategory setting option for each of the plurality of subcategories being displayed and available for selection across all configurations of the category setting options, one of the selectable category setting options being preselected for the user based on the legal jurisdiction associated with the user, the selectable category setting options being selectable by the user;
  receive a user input indicating a selection of one of the category setting options for the setting category;
  apply the configuration of subcategory setting options corresponding to the selected one of the category setting options for the setting category to the user's settings on the online service;
  determine a configuration of subcategory setting options to be assigned to one of the category setting options based on configurations of corresponding subcategory setting options for other users of the online service.

19. A non-transitory machine-readable medium embodying a set of instructions that, when executed by a processor, cause the processor to perform operations, the operations comprising:
  determining a legal jurisdiction associated with a user of an online service;
  causing a settings page corresponding to settings of the user on the online service to be displayed on a device, the settings page comprising selectable category setting options for a setting category, the setting category having a plurality of subcategories, and each subcategory having its own selectable subcategory setting options, each one of the category setting options corresponding to its own distinct configuration of subcategory setting options for its subcategories, each subcategory setting option for each of the plurality of subcategories being displayed and available for selection across all configurations of the category setting options, one of the selectable category setting options being preselected for the user based on the legal jurisdiction associated with the user, the selectable category setting options being selectable by the user;
  receiving a user input indicating a selection of one of the category setting options for the setting category;
  applying the configuration of subcategory setting options corresponding to the selected one of the category setting options for the setting category to the user's settings on the online service;
  determining a configuration of subcategory setting options to be assigned to one of the category setting options based on configurations of corresponding subcategory setting options for other users of the online service.

* * * * *